US012453875B2

(12) United States Patent
Muhammad et al.

(10) Patent No.: US 12,453,875 B2
(45) Date of Patent: Oct. 28, 2025

(54) WALL-MOUNTABLE SPRAY HEAD UNIT

(71) Applicant: PLUMIS LTD., London (GB)

(72) Inventors: Yusuf Muhammad, London (GB); William Makant, London (GB)

(73) Assignee: PLUMIS LTD., London (GB)

( * ) Notice: Subject to any disclaimer, the term of this patent is extended or adjusted under 35 U.S.C. 154(b) by 557 days.

(21) Appl. No.: 17/632,268

(22) PCT Filed: Jul. 29, 2020

(86) PCT No.: PCT/GB2020/051812
§ 371 (c)(1),
(2) Date: Feb. 2, 2022

(87) PCT Pub. No.: WO2021/023970
PCT Pub. Date: Feb. 11, 2021

(65) Prior Publication Data
US 2022/0280824 A1 Sep. 8, 2022

(30) Foreign Application Priority Data
Aug. 2, 2019 (GB) .................................... 1911077

(51) Int. Cl.
*A62C 37/40* (2006.01)
*B05B 1/04* (2006.01)
*B05B 15/652* (2018.01)

(52) U.S. Cl.
CPC ................ *A62C 37/40* (2013.01); *B05B 1/04* (2013.01); *B05B 15/652* (2018.02)

(58) Field of Classification Search
CPC ......... A62C 37/40; A62C 37/04; A62C 37/44; A62C 99/0072; A62C 31/02; A62C 31/05;
(Continued)

(56) References Cited

U.S. PATENT DOCUMENTS 5,727,634 A * 3/1998 Ishida .................... A62C 31/05 169/61
5,808,541 A * 9/1998 Golden .................. A62C 37/40 340/630
(Continued)

FOREIGN PATENT DOCUMENTS

CN 101909701 A 12/2010
CN 208114981 U 11/2018
(Continued)

OTHER PUBLICATIONS

Patent Office of Great Britain, Combined Search and Examination Report, dated Aug. 2, 2021, Application No. GB1911077.4, 6 pages.
(Continued)

*Primary Examiner* — Qingzhang Zhou
(74) *Attorney, Agent, or Firm* — Francis J. Maguire; WARE FRESSOLA MAGUIRE & BARBER LLP

(57) ABSTRACT

A wall-mountable spray head unit (11) is described. The spray head unit comprises a rotatable spray head assembly (8) which comprises a spray manifold (18) rotatable about a first axis (17), a spray nozzle (19) supported by the spray manifold and orientated to deliver a mist of fire-suppressant material radially in a plane in a plane defined by the first axis and a second axis which is perpendicular to the first axis. The spray head unit includes a sensor (20) and/or an interface (35) for receiving a sensor signal from an external sensor and/or a control signal from an external controller. The rotatable spray head assembly does not support a sensor.

18 Claims, 12 Drawing Sheets

(58) Field of Classification Search
CPC ........... A62C 31/03; A62C 37/08; B05B 1/04; B05B 15/652
See application file for complete search history.

(56) References Cited

U.S. PATENT DOCUMENTS

| | | | | |
|---|---|---|---|---|
| 10,850,146 | B2 * | 12/2020 | Lee | B05B 3/1035 |
| 2010/0326677 | A1 | 12/2010 | Jepsen et al. | |
| 2015/0076243 | A1 * | 3/2015 | Fenton | B05B 7/0483 239/589 |
| 2017/0191443 | A1 | 7/2017 | Zhang et al. | |
| 2017/0319882 | A1 | 11/2017 | Hart et al. | |
| 2018/0207460 | A1 * | 7/2018 | Abbott | A62C 31/05 |
| 2019/0232096 | A1 | 8/2019 | Huang | |
| 2019/0321668 | A1 * | 10/2019 | Lee | B05B 12/16 |

FOREIGN PATENT DOCUMENTS

| | | | | |
|---|---|---|---|---|
| JP | H06-292737 | A | 10/1994 | |
| JP | 2001 276272 | A | 10/2001 | |
| WO | 2016/071715 | A1 | 5/2016 | |
| WO | 2017/191443 | A1 | 11/2017 | |
| WO | WO-2018056646 | A1 * | 3/2018 | A62C 37/40 |
| WO | 2019/017782 | A1 | 1/2019 | |

OTHER PUBLICATIONS

English abstracts by EPODOC and WPI, Chinese utility application No. CN208114981U, 1 page.
International Search Report, Application No. PCT/GB2020/051812, mailed Feb. 10, 2021, 6 pages.
English translation of Abstract of JP2001276272A, 1 page.
English translation of full text of publication JP2001276272A (application No. 2000097613), 16 pages.
Notification concerning transmittal (Form PCT/IB/326) of international preliminary report on patentability (Form PCT/IB/373) including Written opinion od the international searching authority (Form PCT/ISA/237), application PCT/GB2020/051812, filed Jul. 29, 2020, 15 pages total.
Chinese Search Report for application 2020800702671, Oct. 25, 2022, 3 pages.
Search Report, United Arab Emirates Ministry of Economy, Patent Application No. P6000203/.2022 filed Feb. 2, 2022, PCT GB 2020/051812 filed Jul. 29, 2020, PLUMIS LTD., completed Oct. 8, 2024, 2 pages.
Office Action Summary (Examination Result), United Arab Emirates Ministry of Economy, Patent Application No. P6000203/.2022 filed Feb. 2, 2022, PCT GB 2020/051812 filed Jul. 29, 2020, PLUMIS LTD., completed Oct. 8, 2024, 8 pages.

* cited by examiner

WALL-MOUNTABLE SPRAY HEAD UNIT

FIELD OF THE INVENTION

The present invention relates to wall-mountable spray head unit for a fire suppression system and to a system including at least one wall-mountable spray head unit.

BACKGROUND

Residential densification, population migration and restrictions on planning and building have led to very high property values in many urban and suburban areas, in many regions of the world. This has led in turn to increased property prices even in many rural areas. Where it occurs, this trend drives property developers to maximise the use of space, yet building regulations often require certain safety features and certain types of layout that use up space.

In addition to usable floor area, consumers have been found to value certain aesthetic and practical configurations within their homes. Notably, media exposure has led consumers to expect more glamorous homes, often with open layouts where escape routes pass through living areas.

For example, in England and Wales, building regulations insist on additional staircases in taller houses, require that space be used to create lobby spaces within apartments, and require that staircases and exit routes not pass through living areas, all to facilitate safe escape from fire. In addition, they mandate that buildings are erected within a certain distance of nearby roads in order to facilitate fire engine access. These stipulations can greatly reduce the value of the property that may be created on a given piece of land.

This tension between fire safety regulations and consumer expectations and desires exists both in new construction projects and in the conversion of basements, lofts and other similar types of space into living space and the reconfiguration of partitioned living space into open-plan areas.

Fire sprinklers and other fire suppression systems are sometimes used in residential and domestic properties as a means to improve the inherent safety of the property and to compensate for particular risks and hazards, and under certain conditions may allow all of the above stipulations to be bypassed.

Despite the design flexibility that they enable, fire sprinkler systems are much less commonly found in residential properties than they are in industrial and commercial premises, due to one or more factors such as cost, concern over water damage, and difficulties with retrofitting a sprinkler system into an existing property. Some alternatives to domestic fire sprinkler systems are gaining popularity; for example, one fire suppression system is marketed by Plumis Ltd. under the name "Automist" and details regarding the system can be found in WO 2016/071715 A1.

SUMMARY

According to a first aspect of the present invention there is provided a wall-mountable spray head unit. The spray head unit comprises a rotatable spray head assembly which comprises a spray manifold rotatable about a first axis, a spray nozzle supported by the spray manifold and orientated to deliver a mist of fire-suppressant material (such as water or a water-based material) radially in a plane defined by the first axis and a second axis which is perpendicular to the first axis. The spray head unit comprises at least one sensor and/or an interface for receiving a sensor signal from an external sensor and/or a control signal from an external controller. The rotatable spray head assembly does not support a sensor.

Thus, the sensor can continuously monitor a room.

The one or more sensors may take the form of thermal sensor(s) and/or thermal camera(s). The sensor or one or more, or all, of the sensors may be integrated into the spray head unit (but not form part of the rotatable spray head assembly). The sensor or one or more, or all, of the sensors may not be included in the spray head unit. The sensor(s) may be installed in the same room as the spray head unit. For example, a sensor may be mounted on the same wall as the first spray head unit, a different wall or in the ceiling. The sensor may be moveable, for example, mounted so as to rotatable.

The spray nozzle may be configured such that the mist consists of droplets of approximately 40 to 120 microns in diameter. The spray nozzle may be configured to form a thin fan of water mist in the plane, which is preferably the vertical plane. This allows the Coanda effect to carry the mist spray. The spray nozzle may be configured to deliver the mist of fire-suppressant material in arc in the plane of at least $2\times\alpha°$, wherein $\alpha$ lies between 25 and 60. $\alpha$ lies between 25 and 40. $\alpha$ may be approximately 32.5.

The spray head unit of may have a front face plane, which, when the spray head unit is installed in a wall the plane is parallel to the wall, the spray head unit comprising two or more sensors and two or more faces orientated off normal to the front face plane for facing different sides of a room, each face supporting one or more sensors oriented normal to the face.

This can help to make it easier to monitor a wider arc (and thus more of a room), for example, up to 180°. There may be three or more faces. The three or more faces may take the form of a half polygonal prism.

The one or more sensors may be one or more pyrometers.

The one or more pyrometers can be used to generate a heat map. Thus, continuous-use cameras can be avoided and so reduce privacy concerns which might discourage use of the system. Although cameras might not be continuously used, they might be used in in time-limited way (e.g., to capture a frame or a set of frames at a suitable interval, such as 5 or 10 minutes) and/or in event-specific circumstances (e.g., once another sensor has detected an indicators of a possible fire).

The rotatable spray head assembly may be able to sweep through an angular range around the first axis of at least 120° while delivering mist.

The rotatable spray head assembly may be able to sweep the assembly up to $\pm\beta°$ while delivering mist, where $\beta°=0$ is perpendicular to the aperture and $\beta$ is at least 75°.

The rotatable spray head assembly may include a range of deployed positions for delivering mist and a parked position in which the spray nozzle is concealed. Thus, when not used, the spray nozzle is stored, hidden from view, in a position which is inaccessible, to protect it from being tampered with or becoming blocked.

The rotatable spray head assembly may include a set position, which differs from a parked position, for readying the rotatable spray head assembly for movement to a deployed position for delivering mist. Thus, the unit may be triggered (by a first signal from a sensor or a controller) so that the rotatable spray head assembly moves from the parked position to the set position and, in response to a signal or further signal from the sensor or from a controller, optionally to rotate further to a deployed position (for example, to point at a fire), and to then activate, i.e., to deploy watermist. In some embodiments, the set position and the deployed position may be the same. In other words, the spray head moves to the deployed position where it is expected to deploy watermist. However, the set position may be a neutral position, for example β°=0, so as to reduce further movement to the deployed position. This can be used when the deployed position is not known. The set position may be a proportion, e.g. a half, of the distance to the deployed position.

According to a second aspect of the present invention there is provided a wall-mounted spray head unit comprising the spray head unit mounted at a height about halfway between floor and ceiling of a room. The spry head nozzle may be mounted between 0.4 and 0.5 of the height between the floor and the ceiling of the room. The room may have a height between the floor and ceiling of 2.5 m. The spry head nozzle may be mounted between 1 and 2 m from the floor of the room.

The spray head unit may further comprise a first controller.

According to a third aspect of the present invention there may be provided a system comprising the spray head unit and a second controller in communication with the first controller.

The second controller may be a main or master controller. The second controller may be in communication with two or more first controllers in respective spray head units. The second controller may be in another spray head unit.

The first controller and/or second controller may (each) comprise one or more processors and memory.

The first controller and/or second controller may be configured to receive and process signals from one or more external sensors and/or one or more control units.

An external sensor of the one or more external sensors may be a smoke detector. An external sensor of the one or more external sensors may be a digital camera. An external sensor of the one or more external sensors may be a humidity sensor. An external sensor of the one or more external sensors may be an air quality sensor. An external sensor of the one or more external sensors may be a passive infra-red sensor. A control of the one or more controls may be a remote-control unit for allowing a user to control the spray head unit.

The spray head unit or the system may further comprise a wireless network interface module in communication with the first controller and/or second controller.

The wireless network be a mobile network (e.g. GSM, 4G, 5G), wireless local area network (WLAN), Long Range Wide Area Network (LoRaWAN), or low-power wide-area (LPWA) network.

The first controller and/or second controller may be configured to transmit data via the wireless network.

The spray head unit or the system may further comprise non-volatile storage accessible by the first controller and/or second controller. The storage may be configured to store data from the at least one sensor. The first controller and/or second controller may be configured to record events in the storage. The first controller and/or second controller may be configured to record the events in the storage with a time-stamp. The time stamp preferably takes the form of a time and date.

The first controller and/or second controller may be configured to control rotation of the spray manifold.

The controller may be configured, in dependence of signal(s) from one or more sensors, to identify occurrence of a predefined event and to signal occurrence of the predefined event.

The predefined event may be detection of an indication of an open window or an open door for at least a predefined period of time. The predefined event may be detection of an indication of mold. The predefined event may be detection of an indication of a water leak. The predefined event may be absence of movement and/or lack of change of occupancy of a room. The predefined event may be time-dependent. In other words, an event may be deemed to have occurred due to the time, for example, deviation from behaviour happening at the same time.

The first controller and/or second controller may be configured to exchange signals with a heating and/or ventilation and/or air conditioning system.

The first controller and/or second controller may be configured to receive and store software updates from a remote location.

The first controller and/or second controller may be configured to determine whether maintenance is required and, if so, to signal that maintenance is required.

The spray head unit or the system may further comprise a speaker for outputting a signal to a user.

The first controller and/or second controller may be configured, in response to receiving respective location-dependent signals from two or more spaced apart sensors, to calculate a distance to, or a location of, a sensed object. The sensed object is preferably a fire.

According to a fourth aspect of the present invention there is provided a system comprising the spray head unit and a sensor in communication with the spray head unit.

According to a fifth aspect of the present invention there is provided the system and a sensor in communication with the second controller.

According to a sixth aspect of the present invention there is provided a system comprising the spray head unit and a pump for supplying fire suppressing material from a source to at least one rotatable spray head assembly. The pump draws fire suppressing material at a rate of less than 6 litres per minute.

The spray head unit can be easily installed in a home and used in lieu of a fire sprinkler.

The first axis may be a substantially vertical axis and the plane may be a substantially vertical plane. The second axis may lie substantially in a horizontal plane.

The spray manifold may only rotatable about the first axis. This can help simply operation of the spray head unit and, thus, reduce complexity and cost of the unit.

The spray head unit may further comprise an inlet port in fluid communication with the nozzle. The inlet port may be co-axial with the first axis.

The, or each thermal sensor, may comprise an infrared thermometer.

The spray manifold may include a face (which may be flat or curved) and the spray head and the at least one thermal sensor may be set in the face.

The spray nozzle and the thermal sensor may be offset in a direction parallel to the first axis. For example, the nozzle may lie just above the thermal sensor or just above the middle of a row of sensors.

The spray head unit may further comprise actuator configured to cause rotation of the spray manifold about the first axis. The actuator may be a servo motor.

The spray head unit may comprise two or more nozzles.

The spray head unit may comprise an enclosure having an aperture and the rotatable spray head assembly may be housed or mainly housed in the enclosure. The enclosure comprises a mounting box (for example, an electrical mounting box) and a faceplate.

The rotatable spray head assembly may be arranged such that, in a parked position, the nozzle is not visible through the aperture. The rotatable spray head assembly may be arranged such that, in an operating position, the nozzle is visible through the aperture or the nozzle protrudes through the aperture.

The spray head unit may further comprise a control unit operatively connected to the at least one thermal sensor and configured to control rotation of the rotatable spray head assembly. The control unit may comprise a microcontroller.

The spray head may be configured, in use, to sweep the rotatable spray head assembly through an angular range around the first axis of at least 120°.

The spray head may be configured to deliver the mist of fire-suppressant material in arc in the plane of at least 2×α°. α may be at least 25°. α may be no more than 60°, 55° or 40°. Preferably, α is about 32°.

The system may comprise a pump for supplying fire suppressing material from a source to at least one rotatable spray head assembly, wherein the pump draws fire suppressing material at a rate of less than 6 litres per minute.

The pump may be a first pump, and the system may further comprise a second pump for supplying fire suppressing material from the source or from another source to the at least one rotatable spray head assembly.

The system may further comprise a drain and at least one valve, the at least one valve arranged to allow pipework to the at last one rotatable spray head assembly to be charged with fire suppressing material without deploying and, thereafter, to be discharged so as to test the system.

According to a seventh aspect of the present invention there is provided a parallel fire suppression system comprising first and second independently-operable fire suppression systems, each of the first and second fire suppression system comprising a respective pump and a respective set of at one least wall-mounted spray head unit connected via respective pipework to the pump, wherein a room is served by a first spray head unit of the first suppression system and a second spray head unit of the second suppression system.

BRIEF DESCRIPTION OF THE DRAWINGS

Certain embodiments of the present invention will now be described, by way of example, with reference to the accompanying drawings in which.

DESCRIPTION OF CERTAIN EMBODIMENTS

Figure 1:
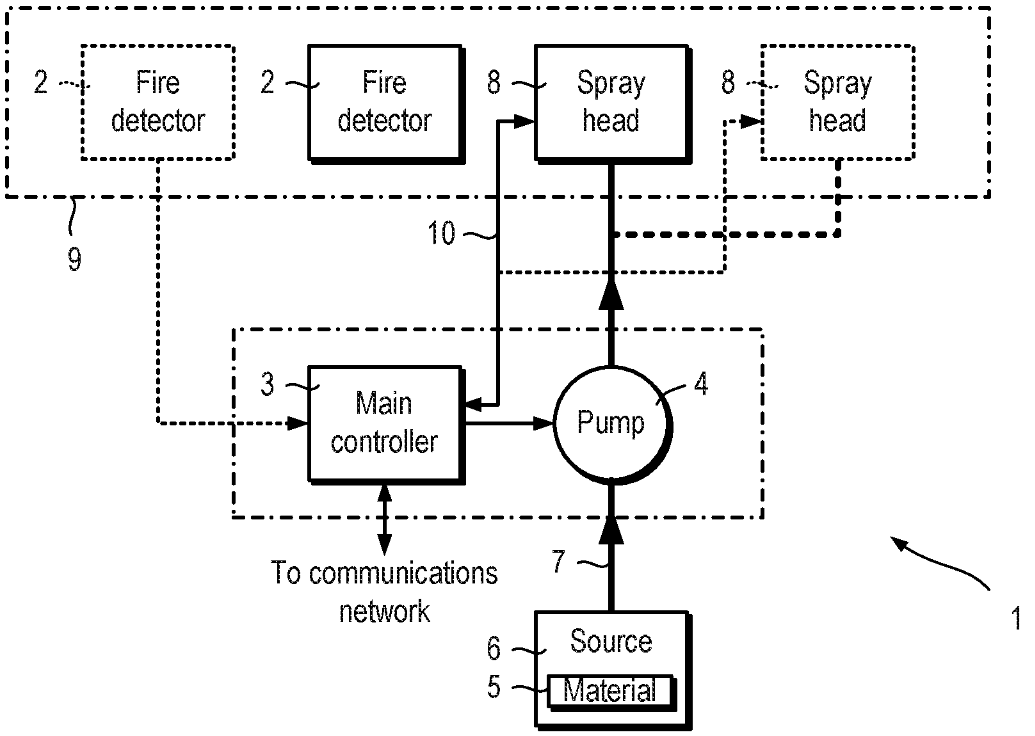
FIG. 1 is a schematic block diagram of a fire suppression system which includes at least one spray head for spraying fire suppressant material.

In the following description, like parts are denoted by like reference numerals.

Referring to FIG. 1, a fire protection system 1 (which may also be referred to as a fire suppression system) is shown.

The system 1 includes at least one fire detector 2, a main controller 3, a pump 4 for supplying fire suppressing material 5, in this example water, from a source 6 via piping 7 to at least one rotatable spray head assembly 8 (herein also referred to simply as a "spray head"). The source 6 is a mains water supply. As shown in FIG. 1, the fire detector 2 and the spray head 8 may be co-located in one space 9. The main controller 3 and the spray head 8 are connected by communication line 10.

The general principle of operation of the system is described in WO 2010/058183 A1 which is incorporated herein by reference.

Figure 2:
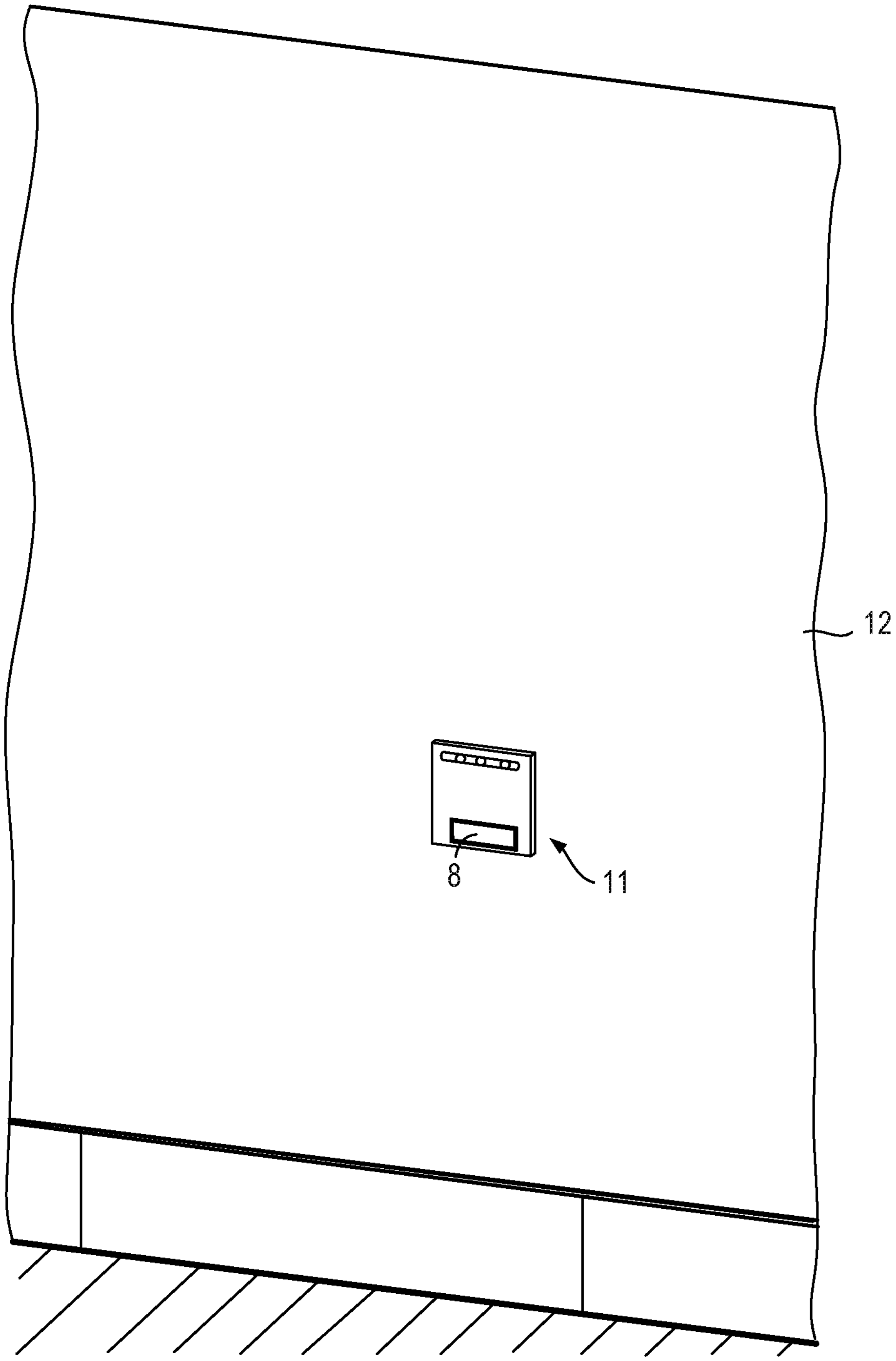
FIG. 2 is a perspective view of a wall and a wall-mounted spray head unit which includes a rotatable spray head assembly.
Figure 3:
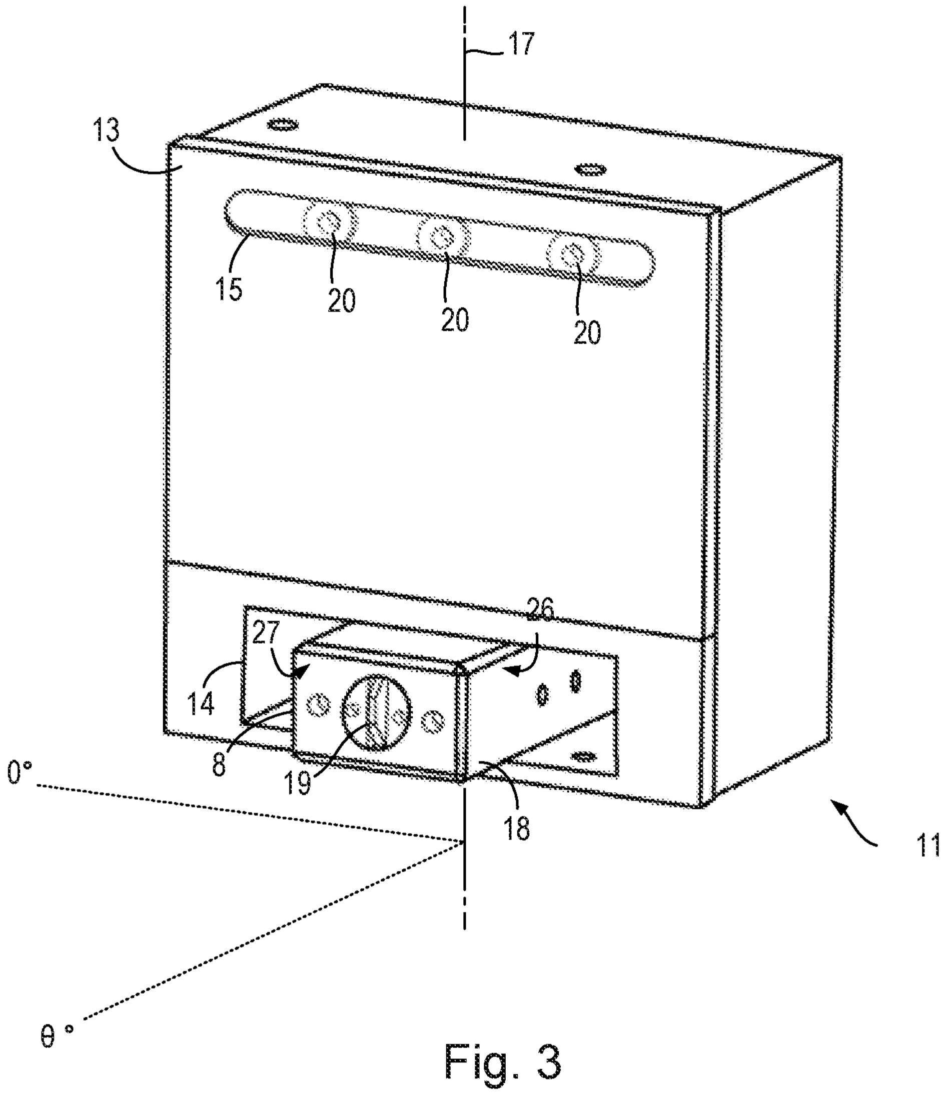
FIG. 3 is a perspective view of a first spray head unit.

Referring also to FIG. 2, each spray head 8 forms part of a spray head unit 11 which is mounted to a wall 12. The spray head 8 is usually kept in a first position ("parked position") which does expose a spray nozzle 19 (FIG. 3). When the system 1 is activated, the spray head 8 is rotated so that the spray nozzle 19 (FIG. 3) is directed at a fire and the pump 4 delivers water 5 at high pressure, in this example about 80 bar (80 MPa), and the spray head 8 sprays a fine mist of water.

The fire suppression system 1 incorporates features which can help (i) to improve its effectiveness, (ii) to demonstrate its reliability and/or (iii) to be harmonious with people and their property.

Effectiveness of the system can be improved by tackling a fire as early as possible and so help to limit exposure of occupants to toxic gasses and heat. Reliability can be demonstrated through validation, for example, by recording and analysing data. Harmony can be increased by deploying a system which takes into account how occupants use their homes.

Referring to FIG. 3, a first spray head unit 11 is shown.

The first spray head unit 11 comprises a faceplate 13, which in this case is a two-part faceplate, having first and second letter-box like apertures 14, 15 disposed in lower and upper portions of the faceplate 13 respectively and a main enclosure portion 16 (herein also referred to as a "mounting box"). Preferably, the main enclosure portion 16 sits in a recess (not shown) in the wall 12.

The spray head unit 11 comprises a rotatable spray head assembly 8 which can turn on one, vertical axis 17, so as to project through the first aperture 14. The rotatable spray head assembly 8 comprises a elongate box-shaped spray manifold 18, a spray nozzle 19, and an inlet port (not shown) which preferably is coaxial with the rotatable spray head assembly's axis of rotation 17. The spray manifold 18 has long, flat side faces 26 and an end face 27, and the nozzle 19 is disposed in the end face 27. Further details regarding the spray head assembly 8 can be found in WO 2016/071715 A1

The spray nozzle 19 is configured to deliver liquid droplets in a specific azimuthal direction, i.e., at an angle θ°, dependent on the rotary position of the spray head assembly 8. The spray nozzle 19 may be fabricated as part of the manifold 18 or as a separate insert.

The system 1 includes one or more sensors 20, preferably taking the form of thermal sensor(s) and/or thermal camera (s), which may be integrated into the spray head unit 11, but not forming part of the rotatable spray head assembly 8. The sensor(s) 20 need not be included in the spray head unit 11 but may be installed in the same room as the spray head unit 11, for example, mounted on the same wall 12 as the first spray head unit 11, a different wall or in the ceiling (not shown). The sensor(s) 20 may be moveable, for example, mounted so as to rotatable.

The sensor 20 is preferably a non-contact thermopile-based infrared thermometer, such as the Melexis MLX90614xCC with a conical field of view where the cone's full angle is approximately 35°.

The sensor(s) 20 continually monitor a room which can help to identify the presence of a fire as early as possible. The sensor(s) 20 can also be used to build a heat map of the room. A history of heat maps can be used to identify patterns of use which can help to reduce the chances of false-positives. By monitoring heat, the system can determine if the head 8 is obstructed, determine if an occupant is in the room, determine if an important fire door has been propped open and the like. Machine learning can be used to predict conditions which might lead up to a fire, for example, such as someone is cooking or smoking, or someone is using candles.

If a centre position of the rotatable spray head assembly is considered to be at a reference angle $\beta°=0$. (where $\beta°=(0°-90°)$), whereby the sensor and nozzle(s) are directed perpendicularly to a flat vertical wall 12 then the assembly is arranged to rotate the spray nozzle 19 to angle $\beta°$ to be sufficiently close to the ±90° positions so as to allow the Coanda effect to carry the mist spray in either direction along the mounting wall 12. Preferably this is achieved by allowing a sufficiently large rotational freedom that the modulus of this azimuthal angle can reach a value as far as $\beta°=\pm75°$ in both directions. Preferably, the rotatable spray head assembly has a "parked" position where the sensor and spray nozzle are not visible from outside the mounting box 15 and faceplate 13. This parked position is reached by driving the azimuthal angle close to or beyond one of the $\beta°=\pm90°$ positions.

The spray head unit 11 comprises a liquid supply hose (not shown), terminated with a mating coupler (not shown) designed to be inserted into the rotatable spray head assembly's inlet port (not shown).

The mounting box 15 is fire-resistant. The mounting box 15 allows the rotatable spray head assembly 8 to be mounted in a stable manner to a wall 12 (FIG. 2) whilst allowing the assembly to rotate on its axis 17, the mating coupler (not shown) remaining firmly in place during rotation. The mounting box 15 provides fixing features, preferably threaded holes (not shown) which can accept bolts (not shown), to allow the faceplate 13 to be attached.

Figure 4:
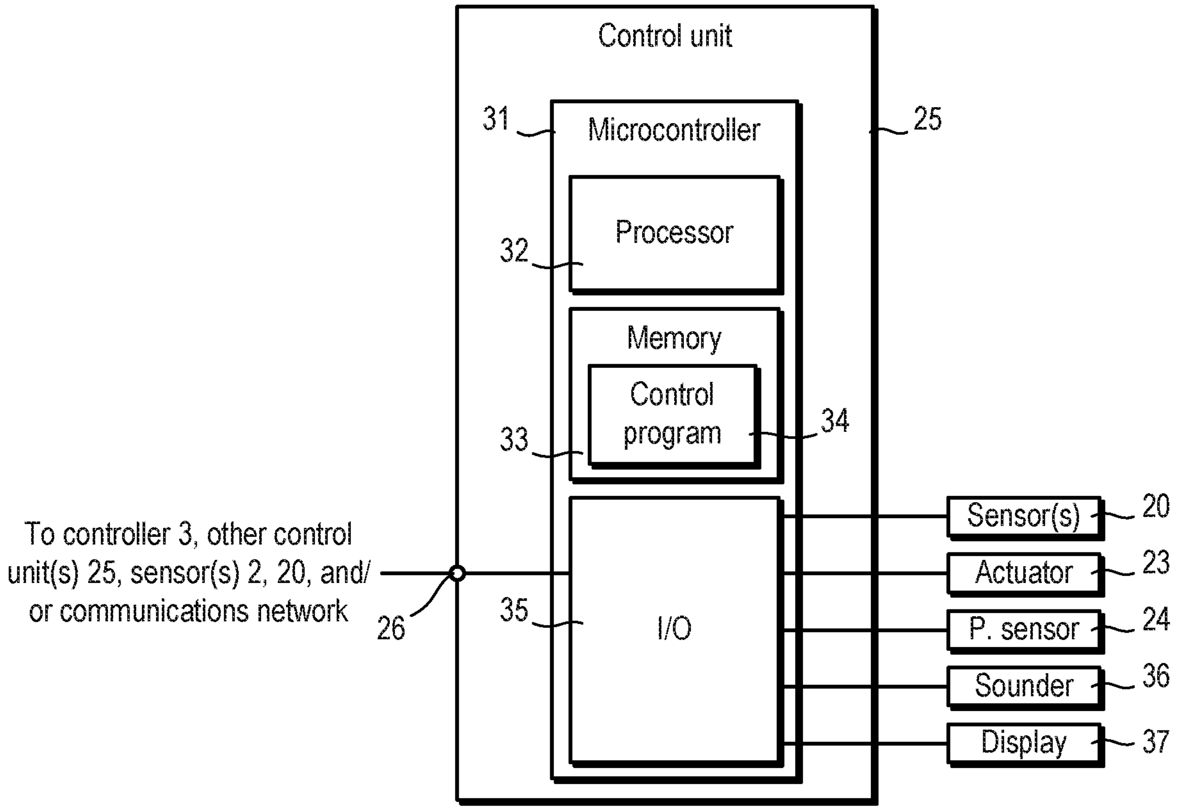
FIG. 4 is a schematic block diagram of a control unit of a spray head unit.

Referring also to FIG. 4, the spray head unit 11 includes a rotary actuator 23 and a position sensor 24. The actuator and position sensor 23, 24 are provided by a servo motor. The spray head unit 11 also includes a gear train (not shown), a control unit 25, sensor cabling (not shown) and an interface 26, for example, a serial bus interface, whereby the spray head unit 12 may be controlled by other devices and/or may control other devices, and/or receive and/or transmit sensor signals.

The spray head control unit 25 includes a spray head controller 31 in the form of a microcontroller having at least one processor 32, memory 33 which stores a control program 34 and input/output module 35 which is in communication with the main controller 3, sensor(s) 20, actuator 23 and position sensor 24. The spray head 11 may include a sounder 36 and/or a display 37, and the input/output module 35 is in communication with the sounder 36 and/or display 37, (via, if necessary, an appropriate driver for each output device).

Figure 5:
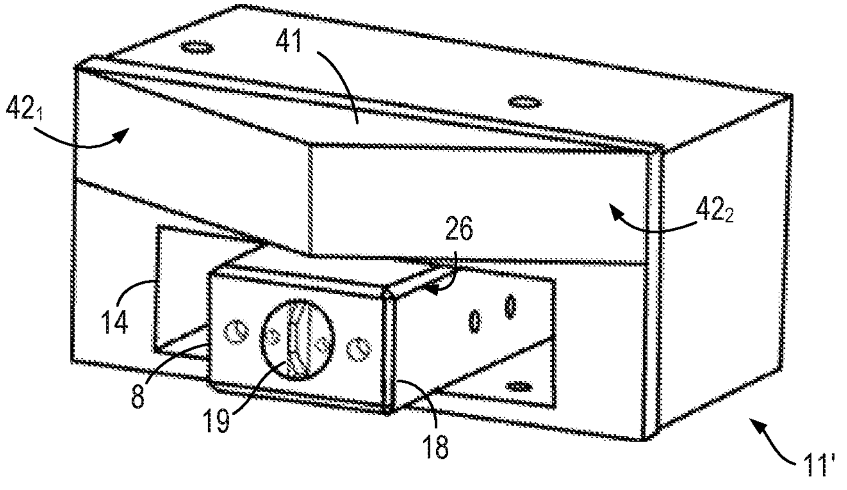
FIG. 5 is a perspective view of a second spray head unit.
Figure 6:
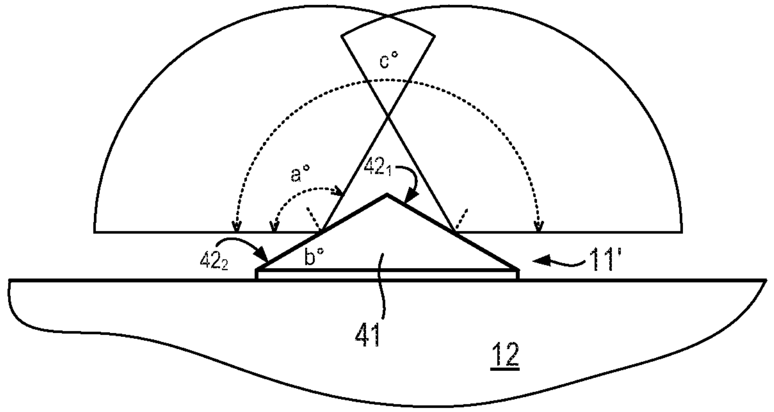
FIG. 6 is a top view of an installed second spray head unit showing 180° sensing range.

Referring also to FIGS. 5 and 6, a second spray head unit 11' is shown.

The second spray head unit 11' is similar to the first spray head unit 11 hereinbefore described, except that an upper portion of the faceplate 13 is provided with a faceted projection 41, for example in the form of a triangular prism 41 having first and second face 421, 422 supporting first and second sensors (not shown) set to sense at a normal to the face 421, 422.

Each sensor (not shown) may have an azimuthal sensing range a° which is an obtuse angle, for example, 120°. The sensors (not shown) are angled at an angle b° of, for example, 30°. Thus, the sensors (not shown) can be used to provide coverage c° of 180°. One or more further faces can be provided, each supporting a respective sensor (not shown). For example, three faces can be used.

The faceplate 13 protects the spray head assembly 8 from inadvertent access or damage by persons. Preferably, the faceplate 13 is of the standardised dimensions of an a.c. electrical blanking plate and attaches by means of a pair of bolts (not shown) with centre spacing and threads compatible with the aforementioned blanking plates in the manner described in WO 2013/114077 A2.

The faceplate 13 has an aperture 14 which is large enough to allow the rotatable spray head assembly 8 to rotate through the range of azimuthal angles without obstruction to the nozzle 19.

The sensor 20 may take the form of a camera or a line of sensors capable of imaging across a wide range of azimuthal angle, β, between for example, −75° and +75°. Thus, the sensor 20 is fixed. This can simplify the spray head unit 11. It enables the sensor 20 to be tested without the need for rotating the spray head assembly 8, to gather data from time to time and so build a model of heat distribution patterns which can be used to identify anomalous occurrences of heat.

An external sensor 20, i.e., not supported by the spray head unit 11. A room which the spray head unit 11 serves may be provided with one or more remote sensors, e.g., located in one or more walls and/or in the ceiling. Thus, sensors can be deployed in less conspicuous locations and operate continuously, periodically or on demand without the need to rotate the spray head assembly 8.

A room need not have any sensors and instead move to deploy fire-suppressing material to a pre-determined location, which may correspond to the location of a bed or chair, or fire risk.

The sensor 20 may be a fixed-point heat detector, preferably with a set point between 57° C. and 58° C. The system 1 may be arranged to be activated by one or more smoke detectors. This can provide earlier activation and therefore may allow a fire to be suppressed before it grows excessively.

The system 1 may employ other forms of sensors to provide external inputs. For example, the system 1 may include a smoke alarm and/or a video camera to identify smoke. The system 1 may include a remote-control unit to allow an occupier to control the system in real time, e.g., to run a diagnostic test. The system 1 may include a humidity sensor, an air quality sensor and/or one or more PIR sensors to provide data to supplement temperature maps.

A detection system may be supplied with controller 3, pump 4 and spray head(s) 8. The main controller 3 may have a standardised interface allowing multiple detection options to be purchased separately. The main controller 3 may be connected to a detection system indirectly. For example, the main controller 3 may be connected by means of an electrical signalling cable to a pressure generator which in turn is linked wirelessly to the heat or smoke detectors by means of a wireless relay.

Figure 7:
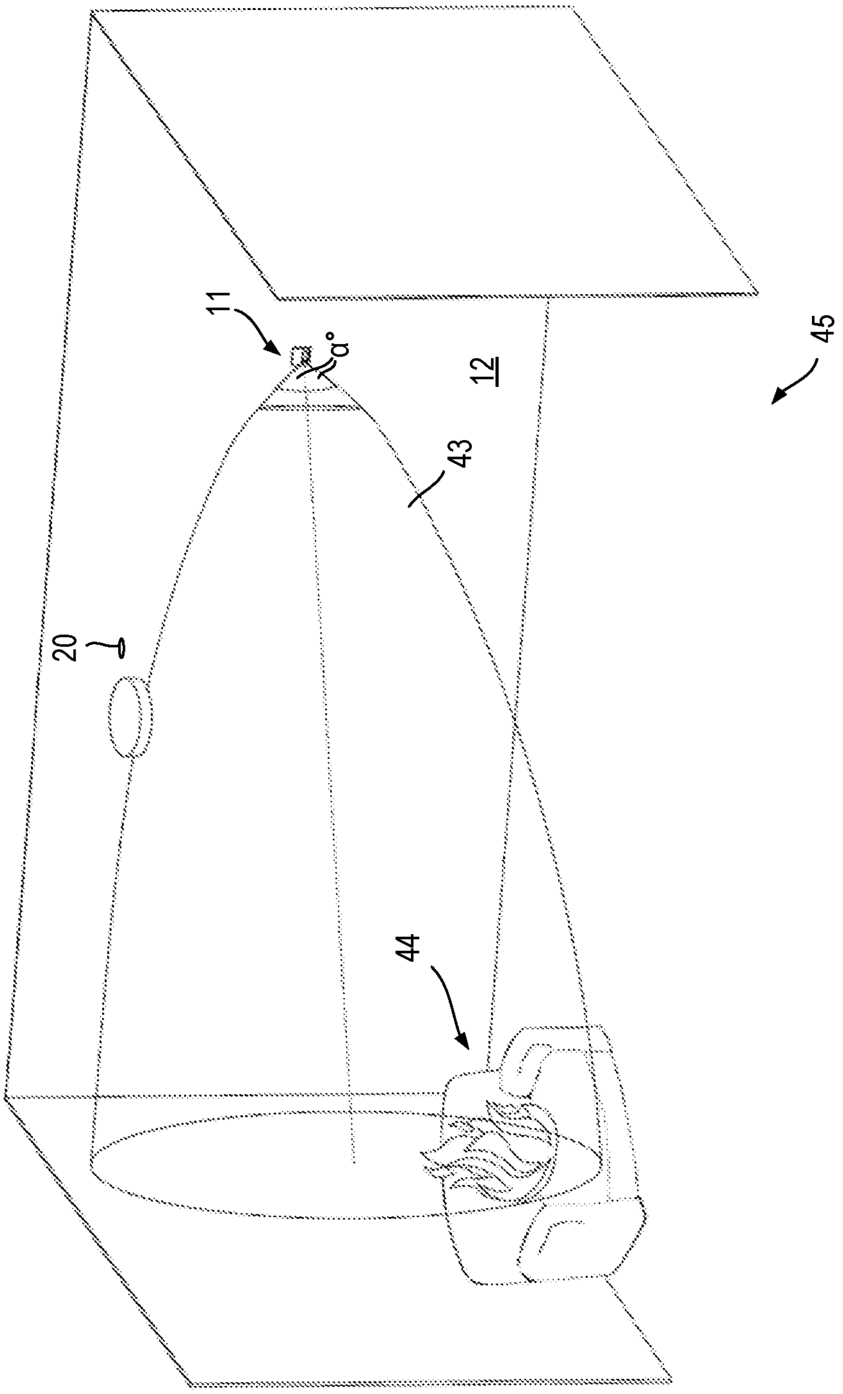
FIG. 7 is a perspective view of a room illustrating the wall-mounted spray head unit in use.

Referring to FIG. 7, the system 1 using a spray head unit 11 can allow a jet 43 of fire suppressant liquid droplets (preferably water or water-based) to be aimed in the general direction of a fire 44, based on the identification of the hottest zone within the room 45 or important zones. The use of heat detectors to activate the device can help to ensure that a large fire is underway when activation occurs. The jet 43 of droplets preferably form a thin vertical sheet of watermist with a suitable shape to permit little wastage of water on the ceiling and floor and with sufficient droplet velocity for the spray to travel several metres. Preferably, the water jet 43 consists of droplets of approximately 40 to 120 microns in diameter, created by forcing the fire suppressant fluid at pressures of approximately 75 to no bar through a small orifice.

One or more sensors 20 may be located in the ceiling of the room 45. For example, a sensor 20 may be located in the middle of the room 45. One or more sensors may be located in one or more walls 12 of the room 45. A sensor 20 may be incorporated into another device, such as a smoke detector, passive infrared detector used for motion sensing and/or light switch.

Preferably, the orifice and associated nozzle components are configured to deliver a thin vertical fan of mist whose droplets exit the orifice with an approximately uniform distribution of velocity vector angles between $\alpha°$ above horizontal and $\alpha°$ below horizontal. Preferably, $\alpha$ lies between 25° and 40° but may be larger, such as 55° or 60°; even more preferably, $\alpha$ takes the value approximately 32.5°.

The aerodynamic interactions between droplets cause the fan to narrow as distance from the nozzle increases, as droplet velocity vectors align increasingly with each other with distance, forming an approximately collimated horizontal jet by a distance of 2 m from the nozzle. Preferably, the spray nozzle is mounted between 1 and 2 m from the floor of the room so that in a typical room height of 2.5 m, the Coanda effect with ceiling and floor will further collimate the jet, increasing its effective range and hence the distance at which the fire suppression remains effective.

Figure 8:
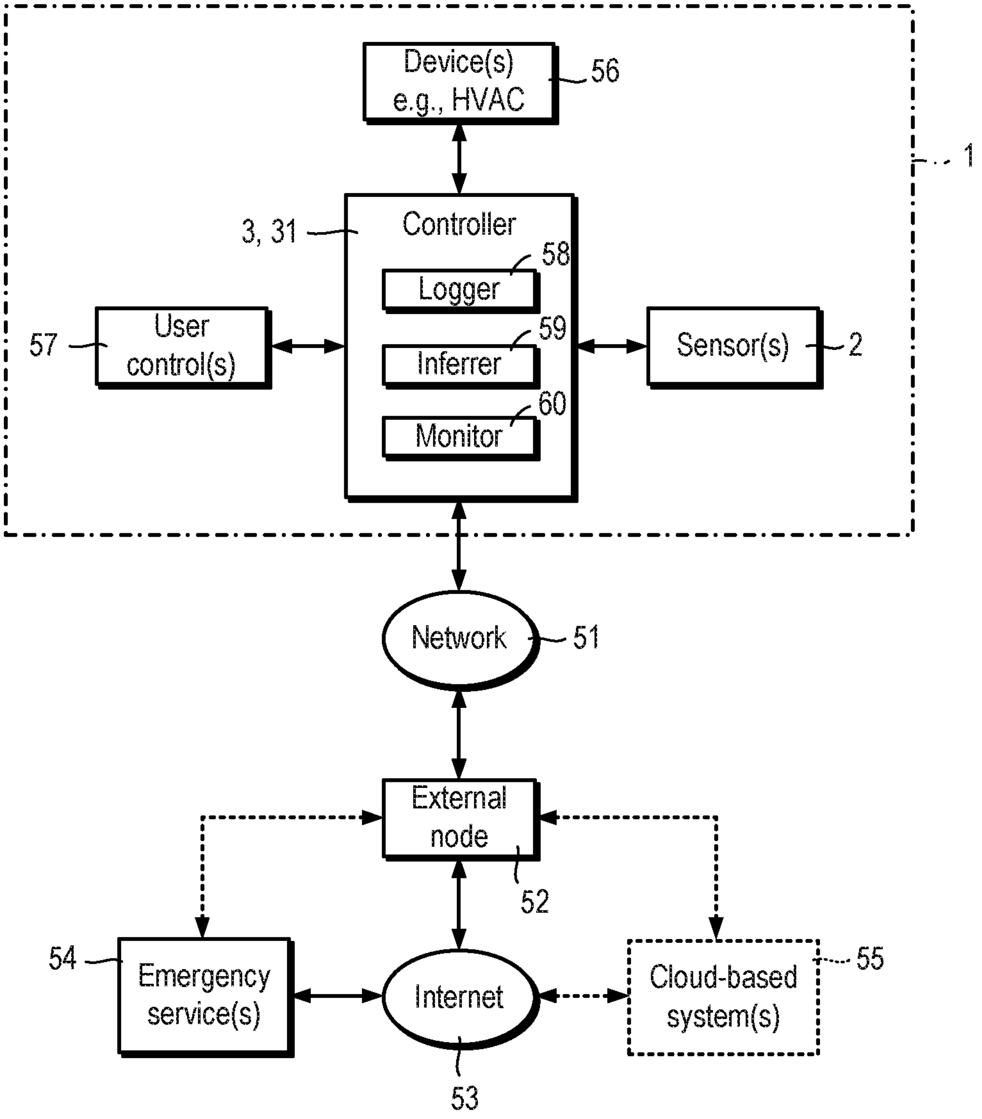
FIG. 8 is a schematic block diagram showing the fire protection system connected to external systems.

Referring to FIG. 8, the system 1 can be connected, via a network 51, to an external node 52 (such as a server, gateway or other computer system) so that an entity, such as the occupant, an insurer or emergency service, can be notified in the event that the system 1 has been compromised, to raise an alarm and the like. The node 52 may be used to provide communication, e.g. directly or via the Internet 53, to an emergency service 54 or a cloud-based system 55.

The system 1 includes the main controller 1 and/or head controller 31, sensors 2, interfaces to other devices 56 (or "appliances") within the flat or house (such as cameras, humidity sensors, heating/cooling systems and the like) and user controls 57 (such as a remote-control unit, a control panel or the like).

The network 51 may take the form of a mobile network (e.g. GSM, 4G, 5G), wireless local area network (WLAN), Long Range Wide Area Network (LoRaWAN), or low-power wide-area (LPWA) network.

The controller 3, 31 can run an event logging module 58 (or "event logger") which can be used to log events in real time, a smoke inferring module 59 (or "inferrer") which can be used to identify a fire from data from a digital camera or other source and a monitoring module 60 (or "monitor") for monitoring activities and conditions and taking appropriate action, such a notifying a care giver or emergency service.

The event logger 58, inferrer 59, monitor 60 or other operating software (not shown) can be updated using "over the air" updates, for example, to improve the inferrer 58 over time. The system 1 preferably has enough computing resources to allow it to operate independently of a connection.

The objectives of improving health and wellbeing and preventing fires are closely linked. Fire mitigation strategies preferably take into account relevant factors, such as the physical and/or mental health of the occupant(s), social care needs, lifestyle, routine and environment.

The monitor 60 can be incorporated into the system 1 which can be retrofitted. This can be used to provide integrated services to people who live and work in housing. This can be used to deliver early intervention and prevention to improve health and wellbeing and tackling problems before they worsen and cause fires. For example, the monitor 59 may be used to help identify if someone has left a window open or propped open a fire door, to identify areas where thermal insulation was poor, to identify the presence of mould and water leaks due to cooler wall temperatures, perhaps if the heating was unnecessarily running overnight.

By operating the system 1 in concert with a heating, ventilation and cooling (HVAC) system (such as a heating system) allow optimisation of energy efficiency and adjust the temperature within the domain (such as flat, house or other occupiable space) depending on, for example, weather. This can be helpful for someone suffering a health issue, such as severe arthritis, which might be exacerbated by harsh temperatures The monitor 60 can be used to monitor occupancy and/or activity levels. For example, the system 1 can be used to identify if an individual has not left a room for a given period of time (for instance 12 or 24 hours) and/or to identify whether someone has been inadvertently left in isolation and has had no visitors, and, if so, to send a message to a care giver.

The monitor 60 can determine whether behaviour and/or conditions for a given time of day deviates beyond limits for that time of day based on past experience and, if so, to send a message to a care giver.

The system 1 may operate a real-time clock (i.e., one providing a date and time) and keep a record of events logged with a date and time. A record of an event may include an event label (e.g., change in number of occupants in a room, high temperature, performance of a test and the like).

The system 1 may determine, based on recorded data whether maintenance is required and, if so, prompt the occupier or other stakeholder (such as landlord) to perform maintenance, i.e., to perform predictive maintenance. For example, the system 1 may periodically, for example, once a week, perform a test whereby the pipes are filled. The pressure in the pipes may be measured using a pressure gauge and recorded. If the pressure is found to drop below a threshold level but which still exceeds a safe operating level, then the monitor 60 may notify the occupier and/or send a message to the occupier or stakeholder. Predictive maintenance may employ machine learning techniques.

Data which is gathered by the system 1, e.g., sensor data, time of events etc., may be used to update how the system operates, e.g., by updating the fire location algorithm, the maintenance-determining algorithm and/or other algorithms or processes run by one or more controllers 3 (FIG. 1), 31 (FIG. 4) in the system.

Referring again to FIGS. 3 and 5, the spray head 11, 11' includes two (or more) sensors, for example $\mathbf{20}_1$, $\mathbf{20}_2$, in the form of two-dimensional pixel array pyrometers ("multipixel sensors"), for example, having 32×24 pixels.

Figure 9:
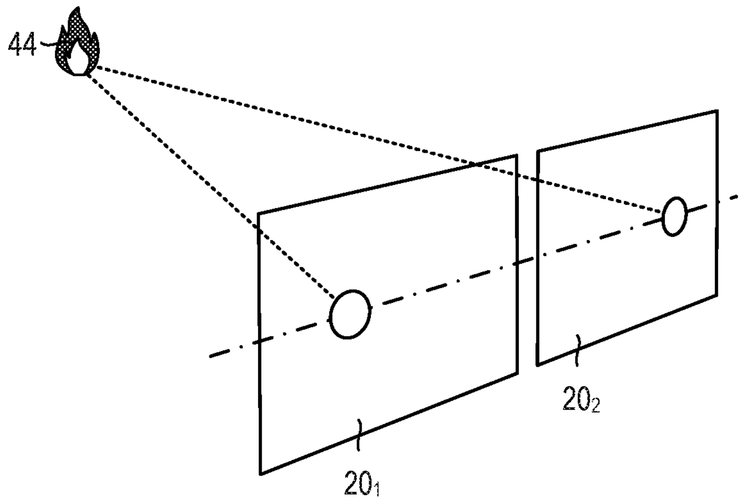
FIG. 9 illustrates fire location using stereoscopic sensing.

Referring also to FIGS. 4 and 9, using two (or more) multipixel sensors $\mathbf{20}_1$, $\mathbf{20}_2$ in a spray head unit 11 allows the controller 31 to calculate a distance to the fire 44, as well as an azimuthal angle.

Figure 10:
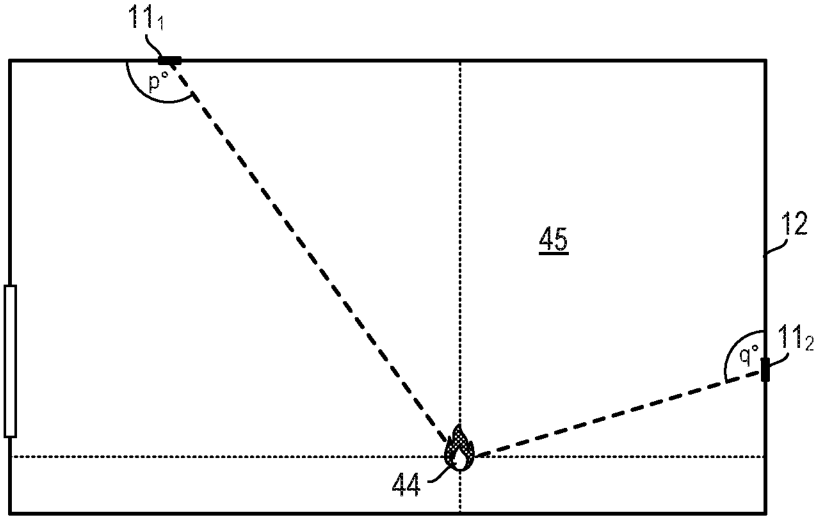
FIG. 10 illustrates fire location using triangulation.
Figure 11:
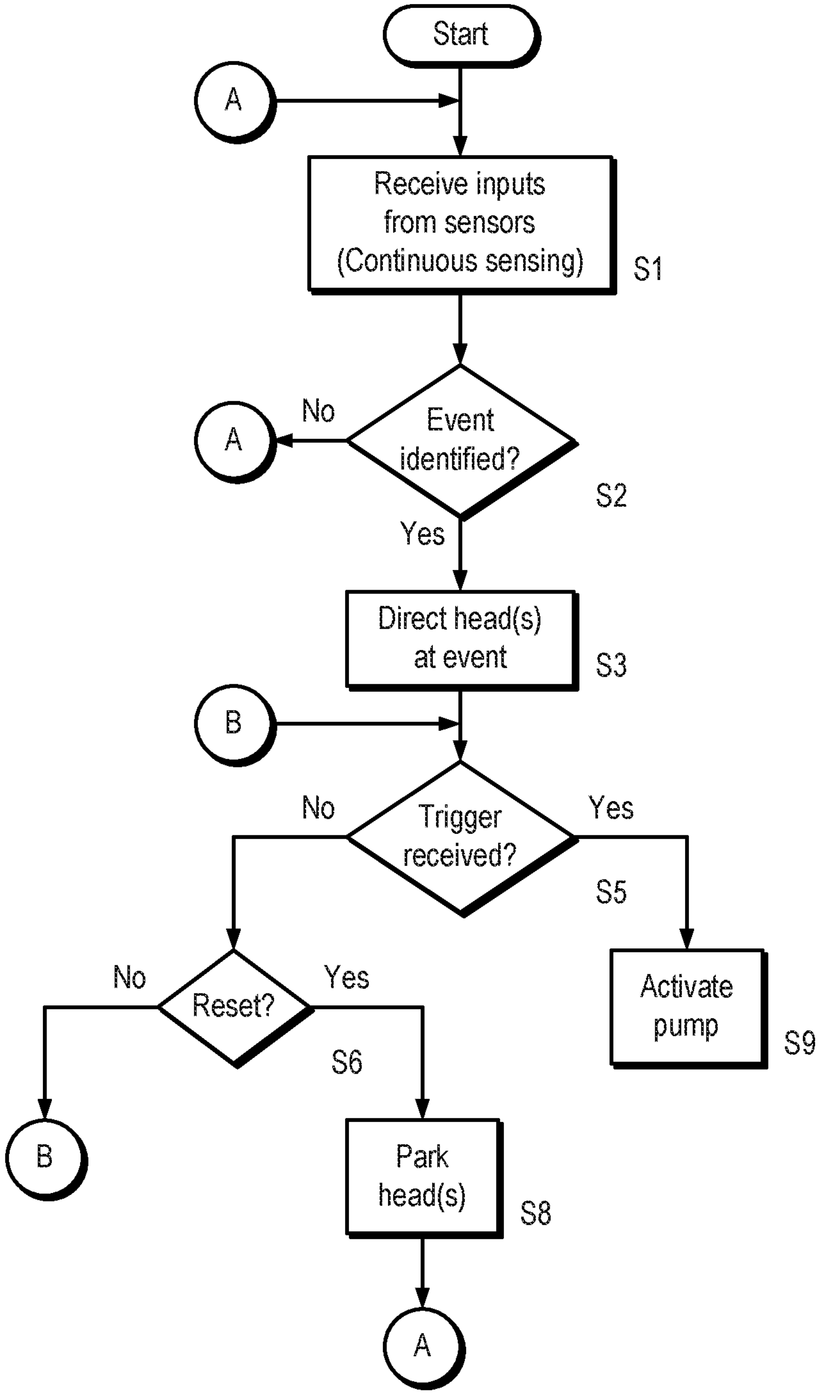
FIG. 11 is a process flow diagram of a method of performed by a fire suppression system.

Referring also to FIG. 10, using two (or more) spray head units $\mathbf{11}_1$, $\mathbf{11}_2$ in a room 45, each having at least a one-dimensional, horizontal pixel array sensor (not shown) which permits angular discrimination allows the main controller 3 (FIG. 1) or a controller 31 (FIG. 4) in one or both of the head units $\mathbf{11}_1$, $\mathbf{11}_2$ to triangulate the location of the fire 44. Room layouts can be captured or input and held in storage and if the angles to the fire 44 in relation to each head $\mathbf{11}_1$, $\mathbf{11}_2$ are found (in this case first and second angles p°, q°) then the range to fire can be found and the location of the fire in the room calculated.

Two (or more) spray head units $\mathbf{11}_1$, $\mathbf{11}_2$ in a room 45 can be used to monitor line of sight between two spray head units $\mathbf{11}_1$, $\mathbf{11}_2$, and so determine whether one spray head units $\mathbf{11}_1$, $\mathbf{11}_2$, has been obstructed.

Operation

Referring to FIGS. 1, 3, 4, and ii, a method of operating the system 1 will now be described.

A controller, for example, the main controller 3 or the head controller 31, continuously received data from sensors 20 and, optionally, other sources (step S1). The data may be stored and processed. If a model of the space is being kept (for example, in relation to patterns of use) then the model may be updated. The controller 3, 31 determines whether an event has been identified (step S2). An event may be, for example, detection of a heat from a fire using a sensor 20. An event may be detection of smoke or other change in conditions which suggest the onset or presence of a fire.

If an event is identified, then the spray head(s) ii can be prepared for use by rotating the spray head 8 such that the nozzle 19 is directed at the fire (step S3). The controller 3, 31 determines whether to trigger to deployment of fire suppressing material (step S5). For example, the trigger may come from another controller which may, for example, validate the presence of a fire, or may come the controller itself, for example, if the controller determines that the fire has grown or if the controller determines that a given period of time has elapsed (for example, 10 seconds) without receiving a contrary indicator (i.e., indicating a false positive).

If the controller 31 receives a reset signal or instruction (step S6) then it causes the spray head 8 to return to its parked position (step S8). If, however, a trigger is received, then the controller 31 cause the pressure generator 4 and/or control valves (not shown) to supply pressurised fluid 5 to the rotatable spray head assembly's supply hose (step S9).

Figure 12:
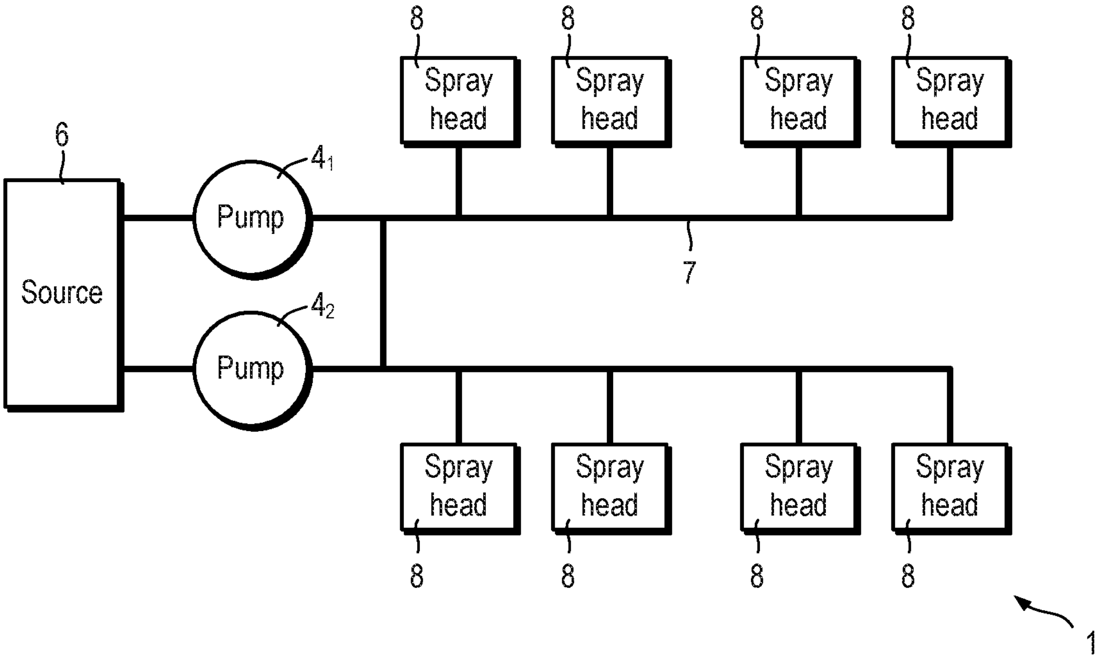
FIG. 12 is a schematic block diagram of a fire suppression system having two pumps.

Referring to FIG. 12, the system 1 may include two pumps 41, 42 running in parallel. This provides redundancy. Furthermore, this can be used can used to maintain pressure should, for example, two heads 8 need to be used.

Referring again to FIG. 1, the controller 3 may change pressure, flow or the number of nozzles used (in a multi-nozzle unit), adjust the size of the office and/or control current to a pump motor so as to control length of spray patterns. Thus, this can be used to deploy a short spray should the fire be far away or under an obstruction.

To help ensure that fire-suppressant material is being effectively delivered, the pipes 7 may include a flow meter, such as a radial flow turbine flow meter, or include a pressure gauge close to the head 8.

Figure 13:
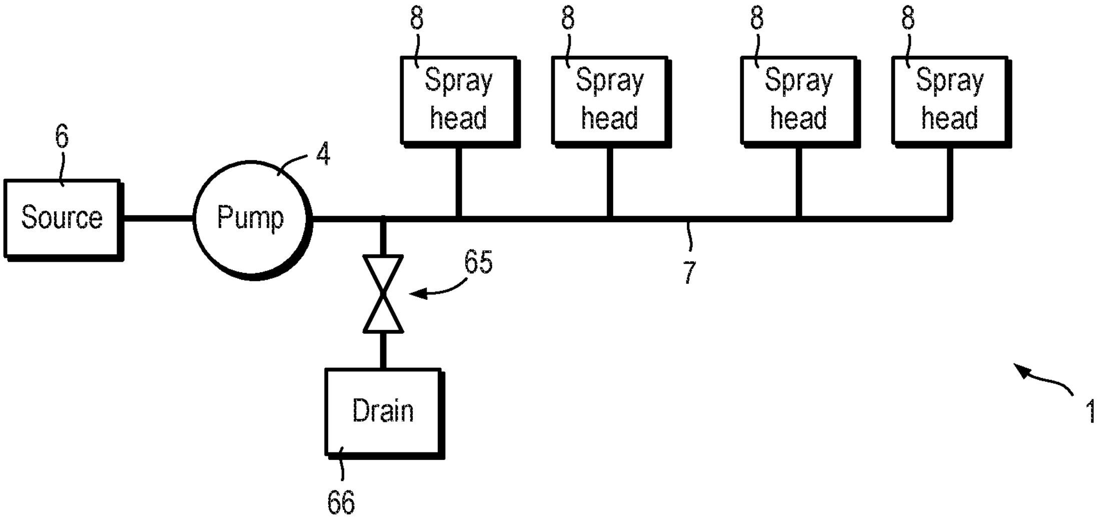
FIG. 13 is a schematic block diagram of a fire suppression system which allows preloading and draining of pipes with fire suppressing material.

Referring to FIG. 13, the system 1 may include a valve 65 and a drain 66 which allows the piping 7 to be loaded with water either during a test or to ready the system.

Figure 14:
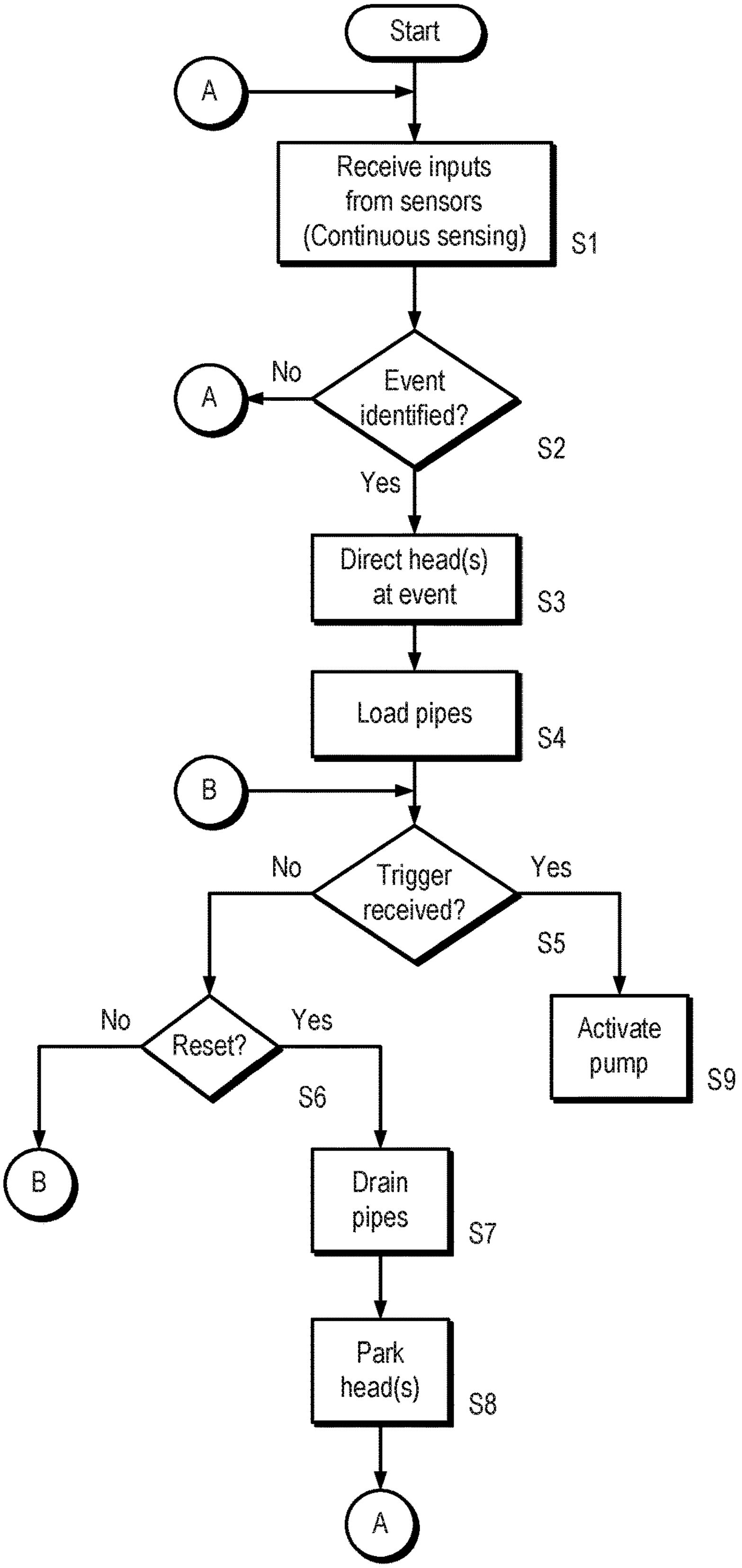
FIG. 14 is a process flow diagram of a method of performed by a fire suppression system when preloading pipes.

Referring also to FIG. 14, as additional steps, if an event is identified (step S2), then the pipes can be pre-loaded with water (step S4). If the system is reset (step S7), then the valve 66 may be opened and the water in the pipes 7 emptied into the drain 66.

Additional pumps and values may be provided to allow the system to be tested with air.

As explained earlier, the system 1 may periodically (e.g. once a week) perform a self-test.

Figure 15:
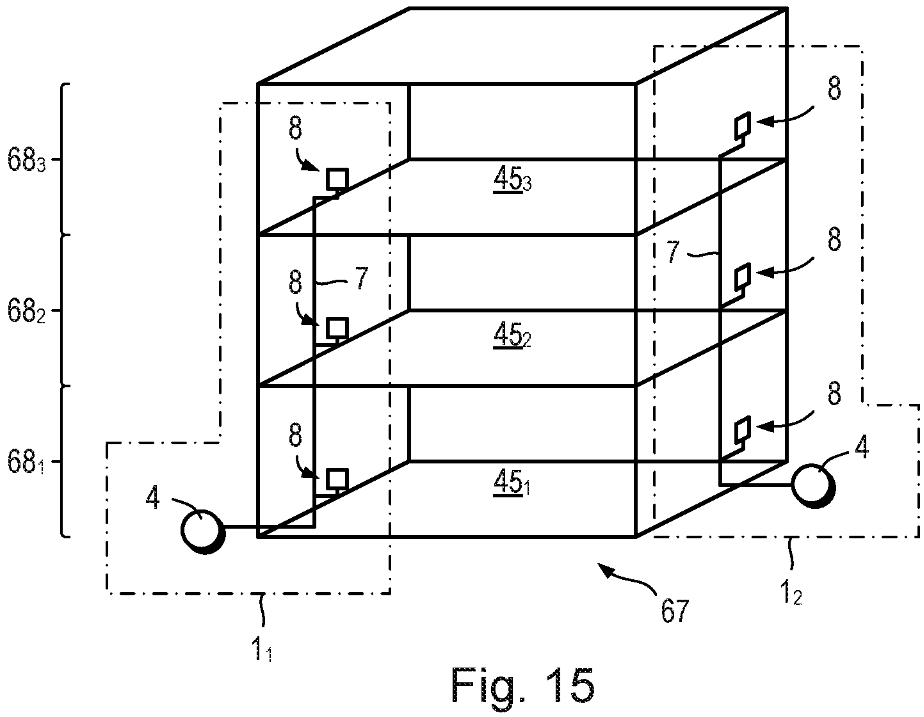
FIG. 15 is a perspective view of a multi-storey building with two fire suppression.

Referring to FIG. 15, a building 67 may be provided with two or more independently operable fire protection systems $\mathbf{1}_1$, $\mathbf{1}_2$. For example, the building 67 may have rooms $\mathbf{45}_1$, $\mathbf{45}_2$, $\mathbf{45}_3$, for example, on different floors $\mathbf{68}_1$, $\mathbf{68}_2$, $\mathbf{68}_3$. Each system $\mathbf{1}_1$, $\mathbf{1}_2$ may be used to provide fire protection to each room $\mathbf{45}_1$, $\mathbf{45}_2$, $\mathbf{45}_3$ and, thus, provide redundancy.

The fire protection system 1 can have one or advantages.

The fire protection system 1 can use small quantities of water (or other fire suppressant materials) since it applies watermist towards the fire and to a narrow band above and/or below it. In experiments, this was found to permit a much smaller quantity of water to achieve the same quality of fire suppression that is required of conventional sprinklers, which may use over wo litres per minute, versus a typical 5.6 litres per minute for our invention.

The spray head 11 is small and easy to install. It can be visually discreet and can easily be rendered aesthetically pleasing when installed, as it can easily be configured to resemble an electrical outlet plate, light switch plate or electrical blanking plate. It is also possible to implement the system 1 at low cost, rendering it even more appropriate for use in the home.

Its one-axis operation, horizontal spray direction, mid-height mounting position and narrow-beam mist spray shape allow a much simpler pointing mechanism Using high-pressure water mist with an approximately collimated spray jet and the Coanda effect interactions with the ceiling and/or floor which may often be parallel with the spray direction can allow effective delivery of a fire suppressant liquid directly to the fire, at a range of up to at least 5.7 metres from the spray head. The choice of coaxial fluid injection into the rotatable spray head assembly is superior to the alternative approach of using a flexible fluid coupling such as a hose, as such flexible couplers tend to have large bend radii and may suffer from fatigue if repeatedly flexed; the superiority of the coaxial approach is even greater when the working pressure is above 75 bar, as hoses designed for such pressures may have reduced flexibility.

The spray head 11 is preferably mounted at a height between 1 m and 2 m and with direct line of sight of all possible fire hazards that the spray head is intended to tackle.

Preferably it is not mounted opposite an open fire or where a radiator or other heat source which subtends a large solid angle falls within its view.

At the time of installation and as part of a subsequent maintenance regime, the spray head 11 can be commissionable and testable in-situ. This is achieved via a commissioning process which includes verification that:

The heat, smoke or flame detection system is operational and successfully interlinked with the rest of the mist suppression system and/or the spray head 11

The spray head and/or the rest of the mist suppression system operates on demand at a correct working pressure, which is indicative of its water path having the correct impedance i.e. no significant leaks or blockages The spray head can successfully identify an artificially provided heat source.

The installation procedure can optionally include a training process in which typical maximum observed temperatures are measured with respect to azimuthal angle. In this process, known sources of heat such as radiators would be activated and allowed to warm up before the rotatable spray head assembly is taken through a calibration sweep.

The spray head may be interfaced directly or indirectly to remote diagnostic and/or alerting equipment by means of a telematic network such as a cellular radio network or the Internet. This network permits remote alerting of the presence of a fire and of equipment activation; it allows remote signalling of any detectable faults such as failing or failed batteries in heat or smoke detectors, a failure to rotate correctly of the rotatable spray head assembly, or a failure of the assembly's thermal sensor. It can straightforwardly be arranged that the system performs a self-test with remote signalling of the result periodically, and/or the self-test may be on-demand, prompted by a local signal (e.g. a button press) or remote signal (e.g. a text message, e-mail message, or an HTTP page load by a remote server of a URI served up by the invention or its associated equipment).

Communication between elements of the overall suppression system including pressure generators, control valves, the spray head and separate heat, smoke or flame detectors, can employ a variety of technologies. Preferably, the heat and smoke detectors are interfaced to other devices using a wireless radio protocol, which offers the benefit of ease of installation of the detectors. Preferably, the communication link between the spray head and the pressure generator that serves it should be by cable connection. A physical cable between these components can be implemented at very low cost, and can be installed at the same time and along the same route as the high pressure hose that connects the pressure generator to the spray head. The cable may be an Ethernet cable such a Category V or Category VI cable, or fire-resistant variants thereof. The system may employ a traditional networking technique such as TCP/IP over the cable, or it may use RS-485 or another protocol. Alternatively the cable may be used to provide a simple Normally Open contact which can be closed in the event of a fire, either to signal activation from another part of the system to the spray head, or to allow the spray head to signal a fire to the pressure generator to which it is connected. The cable may also be designed to carry sufficient electrical voltage and current to provide power for the spray head's motorised movement and to power the electronics therein. For example, the cable may be used in the manner known as "Power over Ethernet (PoE)". The cable must be terminated at either end by a connection technique that is robust to mechanical vibration, ingress of dust, and diurnal temperature variations over many days. For example, screw terminals may be used, or Ethernet RJ-45 connectors may be used provided that suitably robust connector variants are selected.

In the event of a fire close to the spray head, in which the spray head may need to operate for an extended period at elevated temperatures, the rotatable spray head assembly's axis of rotation and mounting system will remain static even if the motor ceases to function. This is achieved by manufacturing the relevant structural spray head components from metals such as steel and brass. The motor does not form part of the support for the rotatable spray head assembly. The spray head and associated hoses may include some elements which will eventually fail at an elevated temperature that may be encountered in a fire. These components are designed to last at least 30 minutes in the event of a fire; some such as hoses achieve this through water cooling as water flows through them and through some physical separation from the fire by thermally insulating materials.

Broadly speaking, performance declines with distance from the fire, due to factors such as droplets falling out or sticking to the ceiling or walls en route to the fire, and a lack of perfect spray beam collimation leading to a more diffuse suppression spray at greater distances. The system is tested to pass sprinkler standards with the spray head at a maximum allowable distance from the fire. The maximum allowable distance is determined through testing and will depend on the water flow employed. For example, the maximum allowable distance may be 5.7 m.

By contrast, if the fire occurs directly below the spray head, or above/below it and within 1 metre, the spray beam may in some cases (at such a short working distance from the nozzle(s)) be too narrow to spray the fire directly; however in tests it was found that the apparatus can still suppress the fire adequately to pass the requisite sprinkler tests. In such cases, one contributory factor to this effective suppression is the following process. The high density of droplets close to the nozzle and their high speed at that location creates an air draft which draws the flames towards and into the spray. This helps prevent the flames from growing beyond the height of the nozzle.

If new sprinkler tests are evaluated at a later date and it is discovered that fires close to the spray head cannot be adequately suppressed without additional elements, the system design guidelines can be readily adapted to ensure that there is no such unprotected position in the room, by the use of extra spray heads, and if necessary the associated additional pumps and/or control valves to service that spray head. Other strategies may also be used to obviate the need for such additional spray heads, including a shaped spray pattern that emits a small proportion of the emitted spray downwards and/or upwards, so that beyond the angle $\alpha°$, the droplet flux does not drop completely to zero; and including additional nozzle(s) pointing up and down.

It will be appreciated that many modifications may be made to the embodiments hereinbefore described.

For example, there may be more than one nozzle.

There may be more than one sensor.

An improvement may be to add another strategy to tackle fires directly below (or above) the spray head by providing a different water path when the spray head is in the aforementioned parked position. A small funnel is provided to one side within the mounting box so that if the pressure generator is activated while the spray head is "parked", the watermist jet is captured by this funnel and the flow redirected to orifices below and/or above the spray head. The watermist spray will be much reduced in velocity by this arrangement but can act similarly to a conventional sprinkler within a small area adjacent to the spray head. Such a feature would be used when the fire location algorithm was able to conclude that the fire was close to the spray head.

Another improvement allows the targeted spray to be used for security purposes in a combined fire and security system. A short burst of spray would be targeted at an intruder based on either body temperature as sensed by the infrared thermometer, or additional passive infrared sensors, and activated by security sensors known in the art such as door switches, PIR detectors and weight detection pads. This spray can be used to "tag" an intruder with a variety of waterborne tagging materials such as specialist inks and labelling systems, which may be introduced into the water flow by means of a venturi or similar arrangement. Such systems are known in the security industry and go by names such as SmartWater. Alternatively, such a system may be used to deliver other substances, for example fluids designed to disable an intruder.

The invention claimed is:

1. A wall-mountable spray head unit comprising:

a rotatable spray head assembly which comprises:

a spray manifold rotatable about a first axis; and a spray nozzle supported by the spray manifold and orientated to deliver a mist of fire-suppressant material radially in a plane defined by the first axis and a second axis which is perpendicular to the first axis;

a non-rotatable faceplate that, when the spray head unit is installed in a wall, is parallel to the wall and the first axis;

at least one sensor fixed in the faceplate;

wherein the rotatable spray head assembly does not support a sensor;

and wherein the faceplate comprises:

an aperture through which the spray nozzle protrudes when delivering the mist; and a faceted projection comprising at least one face, wherein the at least one face is orientated off normal to the faceplate for facing a respective side of a room and supports one or more sensors oriented normal to the face.

2. The spray head unit of claim 1, wherein the spray nozzle is configured to form a fan of water mist in the plane.

3. The spray head unit of claim 2, wherein the fan allows the Coanda effect to carry the mist spray.

4. The spray head unit of claim 2, wherein the spray nozzle is configured to deliver the mist of fire-suppressant material in arc in the plane of at least $2\times\alpha°$, wherein $\alpha$ lies between 25 and 60.

5. The spray head unit of claim 4, wherein $\alpha$ lies between 25 and 40.

6. The spray head unit of claim 5, wherein $\alpha$ is 32.5.

7. The spray head unit of claim 1, the spray head unit comprising:

two or more sensors; and two or more faces orientated off normal to the faceplate for facing different sides of a room, each face supporting one or more sensors oriented normal to the face.

8. The spray head unit of claim 1, configured to be mountable to a wall, wherein the spray nozzle is directable perpendicularly to the wall.

9. The spray head unit of claim 1, wherein the spray nozzle is configured such that the mist consists of droplets of 40 to 120 microns in diameter.

10. The spray head unit of claim 1, wherein the rotatable spray head assembly is able to sweep through an angular range around the first axis of at least 120° while delivering mist.

11. The spray head unit of claim 1, wherein the rotatable spray head assembly is able to sweep the assembly up to $\pm\beta°$ while delivering mist, where $\beta°=0$ is perpendicular to the aperture and $\beta$ is at least 75°.

12. The spray head unit of claim 1, wherein the rotatable spray head assembly includes a range of deployed positions for delivering mist and a parked position in which the spray nozzle is concealed.

13. The spray head unit of claim 1, wherein the rotatable spray head assembly includes a set position, which differs from a parked position, for readying the rotatable spray head assembly for movement to a deployed position for delivering mist.

14. A wall-mounted spray head unit comprising:

the spray head unit of claim 1 mounted at a height about halfway between floor and ceiling of a room.

15. The wall-mounted spray head unit of claim 14, wherein the room has a height between the floor and ceiling is 2.5 m.

16. A wall-mounted spray head unit comprising:

the spray head unit of claim 1 mounted at a height in a range between 1 m and 2m from the floor a room.

17. The spray head unit of claim 1, further comprising:

a first controller.

18. A system comprising:

the spray head unit of claim 17; and a second controller in communication with the first controller.

* * * * *